US009735862B2

(12) United States Patent
Polehn et al.

(10) Patent No.: US 9,735,862 B2
(45) Date of Patent: Aug. 15, 2017

(54) SYSTEM AND METHOD FOR PROVIDING CELLULAR SIGNALS TO MOBILE DEVICE USERS TRAVELLING BY AIR

(71) Applicant: Verizon Patent and Licensing Inc., Arlington, VA (US)

(72) Inventors: Donna L Polehn, Kirkland, WA (US); Fred Weisbrod, Renton, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 22 days.

(21) Appl. No.: 14/486,365

(22) Filed: Sep. 15, 2014

(65) Prior Publication Data
US 2016/0080073 A1    Mar. 17, 2016

(51) Int. Cl.
| H04W 4/00 | (2009.01) |
| H04B 7/26 | (2006.01) |
| H04B 1/04 | (2006.01) |
| H04B 1/3822 | (2015.01) |
| H04L 27/12 | (2006.01) |

(52) U.S. Cl.
CPC ............. *H04B 7/26* (2013.01); *H04B 1/04* (2013.01); *H04B 1/3822* (2013.01); *H04L 27/12* (2013.01)

(58) Field of Classification Search
CPC .............. H04B 7/18506; H04W 84/06; H01Q 3/2605; G01S 1/40; G01S 3/16; G01S 3/325
USPC ...................................... 455/430, 431, 562.1
See application file for complete search history.

(56) References Cited

U.S. PATENT DOCUMENTS

| 4,042,931 | A | * | 8/1977 | Gustafsson | G01S 3/22 342/427 |
| 5,818,383 | A | * | 10/1998 | Stockburger | G01S 3/46 342/109 |
| 6,133,866 | A | * | 10/2000 | Kanter | G01S 3/325 342/146 |
| 6,675,013 | B1 | * | 1/2004 | Gross | H04B 7/18504 455/11.1 |
| 8,688,108 | B2 | * | 4/2014 | Kaminski | H01Q 1/246 343/705 |
| 2005/0285785 | A1 | * | 12/2005 | Martin | H01Q 3/2611 342/372 |
| 2009/0096857 | A1 | * | 4/2009 | Frisco | H04B 7/18508 348/14.02 |
| 2009/0186611 | A1 | * | 7/2009 | Stiles | H04B 7/18506 455/431 |
| 2011/0034191 | A1 | * | 2/2011 | Leabman | H04B 7/18506 455/501 |
| 2011/0215968 | A1 | * | 9/2011 | Le Comte | G01S 1/40 342/406 |
| 2012/0112953 | A1 | * | 5/2012 | Grau Besoli | G01S 7/03 342/146 |

(Continued)

Primary Examiner — Simon Nguyen

(57) ABSTRACT

A system and method are disclosed for providing broadband network access to mobile devices during air travel. The system transmits a first signal from a phased array antenna towards an airspace. The system also steers the phased array antenna towards an aircraft within the airspace based on a determined movement of the aircraft, a device signal generated by a mobile device aboard the aircraft, or a combination thereof. The system also determines a frequency shift associated with a return of the first signal from the aircraft. Still further, the system determines a second signal of a different frequency based on the frequency shift.

20 Claims, 10 Drawing Sheets

(56) References Cited

U.S. PATENT DOCUMENTS

| | | | |
|---|---|---|---|
| 2012/0202418 A1* | 8/2012 | Jalali | H01Q 1/2291 |
| | | | 455/15 |
| 2013/0271321 A1* | 10/2013 | Anderson | H01Q 13/025 |
| | | | 342/368 |
| 2013/0324070 A1* | 12/2013 | Bennett | H04B 7/18506 |
| | | | 455/404.1 |
| 2014/0327577 A1* | 11/2014 | Ozaki | H01Q 3/26 |
| | | | 342/367 |
| 2015/0288073 A1* | 10/2015 | Hall | H01Q 17/00 |
| | | | 342/2 |
| 2016/0212669 A1* | 7/2016 | Davis | H01Q 3/2605 |

* cited by examiner

100

340

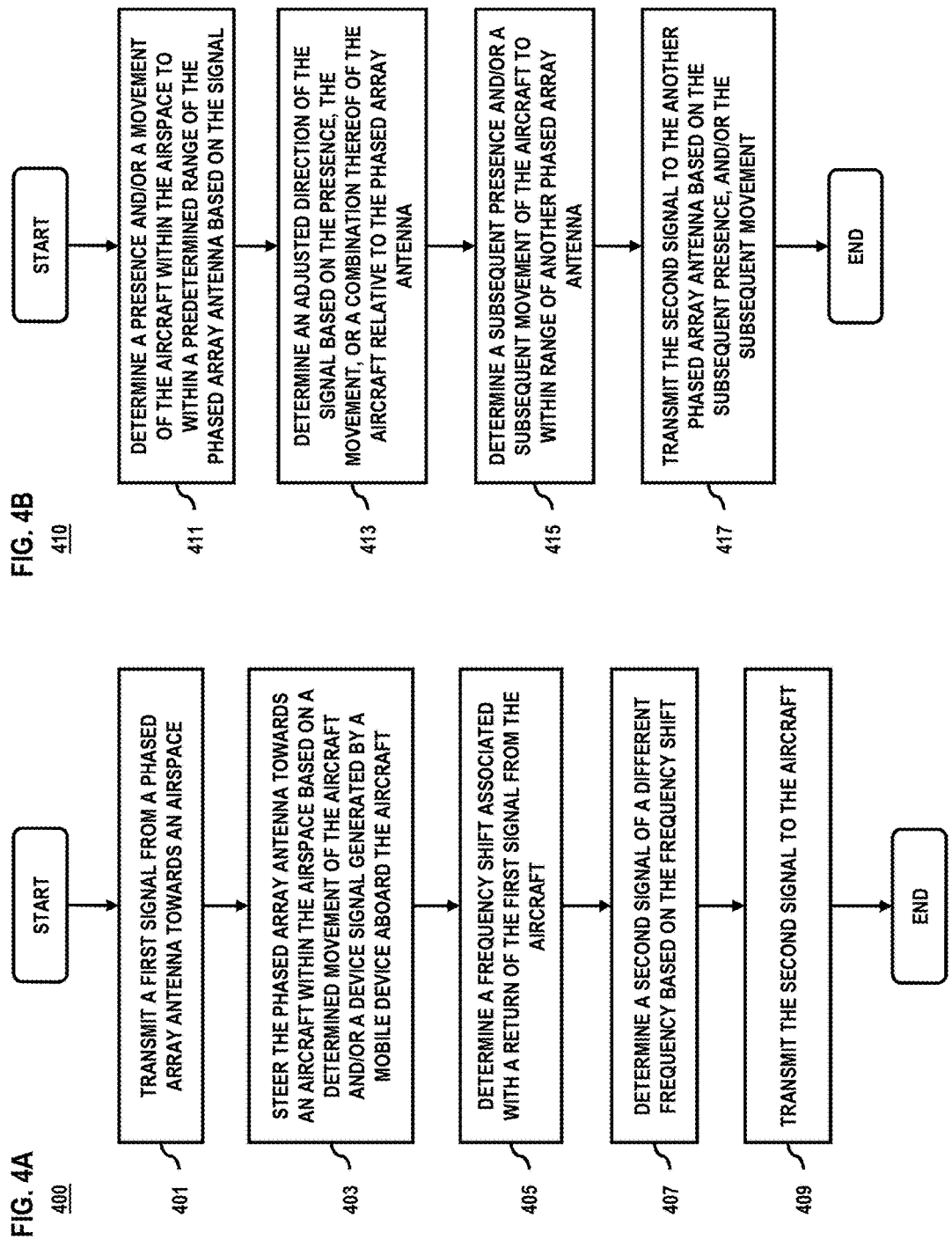

418

SYSTEM AND METHOD FOR PROVIDING CELLULAR SIGNALS TO MOBILE DEVICE USERS TRAVELLING BY AIR

BACKGROUND INFORMATION

Consumer adoption of mobile devices, such as cellular telephones, laptop computers, pagers, personal digital assistants, and the like, has increased dramatically over recent years. With this increasing demand comes an ever growing need to provide users with reliable network access, including during air travel or other high speed modes of transportation. Currently, many commercial aircraft are configured with terrestrial based network access systems for providing low speed or limited bandwidth service. Unfortunately, these systems are seldom capable of providing the high speed, high bandwidth network access users are accustomed to when their devices are within range of a cell site at ground level. In addition, most cell sites feature antennas that transmit signals towards the ground rather than towards aircraft. Still further, the high speed of the aircraft during travel along with the weak signal link (power) from the mobile device to the antenna located at ground level limits network access.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 4A-4C are flowcharts of processes for providing broadband network access to mobile devices during air travel, according to various embodiments;

DESCRIPTION OF THE PREFERRED EMBODIMENT

An apparatus, method, and software for providing broadband network access to mobile devices within an aircraft, is described. In the following description, for the purposes of explanation, numerous specific details are set forth in order to provide a thorough understanding of the various embodiments described. It is apparent, however, to one skilled in the art that the various embodiments described may be practiced without these specific details or with an equivalent arrangement. In other instances, well-known structures and devices are shown in block diagram form in order to avoid unnecessarily obscuring the various embodiments.

Figure 1A:
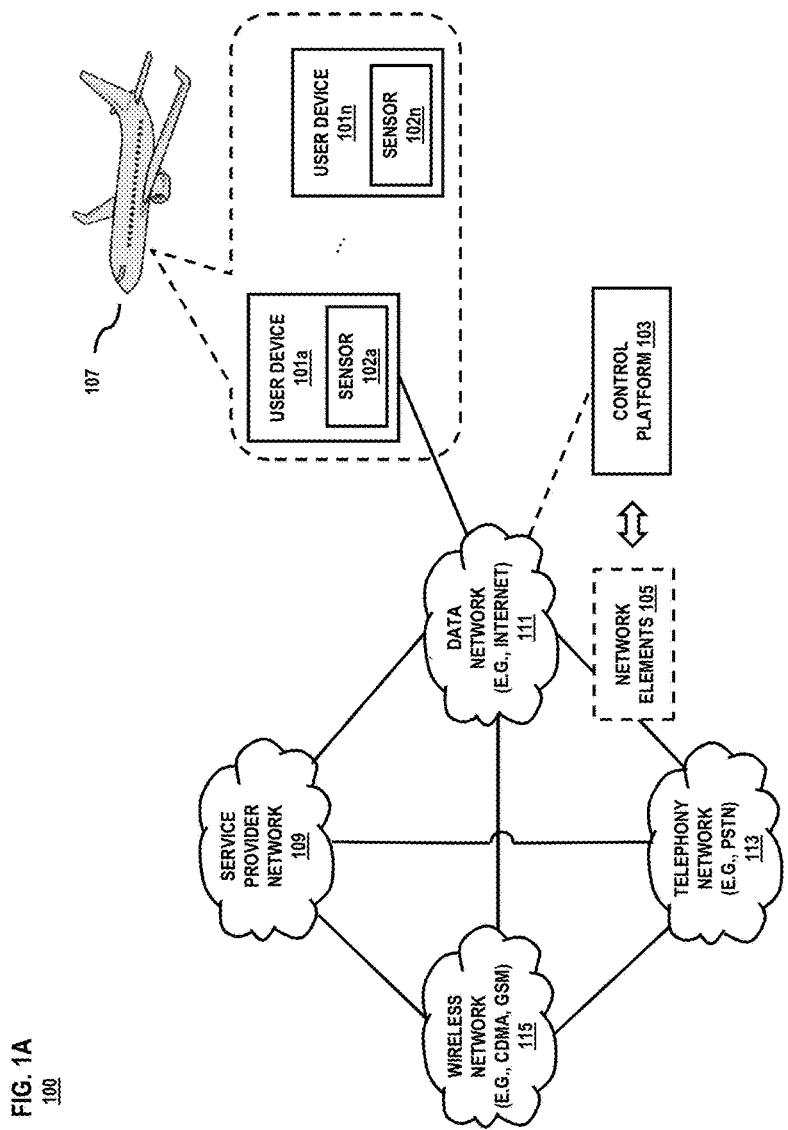
FIG. 1A is a diagram of a system for providing broadband network access to mobile devices during air travel, according to one embodiment.

FIG. 1 is a diagram of a system for providing broadband network access to mobile devices within an aircraft, according to an exemplary embodiment. For the purpose of illustration, system 100 is described with respect to a control platform (or platform) 103, which is configured to operate in connection with various elements 105 of a communication network, e.g., a wireless network 115, telephony network 113, etc. The elements 105 of the communication network may include various antennas, receivers, signal generation components, routers and other network communication equipment. Still further, the network elements 105 may include various hardware and/or firmware components for enabling high speed communication such as long-term evolution (LTE). While the system 100 is described with respect to high speed communication protocols and techniques such as LTE, the embodiments herein may pertain to any communication protocols or standards. This may include, for example, LTE Advanced, time division LTE (TD-LTE), system architecture evolution, worldwide interoperability for microwave access (WiMAX), evolved high-speed packet access (HSPA+), Multimedia Broadcast Multicast Services (MBMS), or any future or still developing protocols.

As mentioned previously, the increased use of network ready mobile devices by users has resulted in greater demand for high speed/bandwidth network access. This demand for mobility also extends to air travel, super rail or other high speed modes of transportation. It is common nowadays for some aircraft, i.e., commercial or private airplanes, to feature systems for providing basic or low speed data communication to mobile device users abroad. However, this requires that the airplane be configured with a repeater device, external antennas, cabling and interconnects and other components for propagating network signals throughout the airplane. This can be costly to the provider or manufacturer of the airplane and may still only result in limited network access and functionality.

One of the key issues surrounding network access during air travel is weak reverse link connectivity. This means the wireless connection from the mobile device to the fixed network base station (e.g., a cell site) on the ground has too little power or signal gain to permit the mobile device to access the network of their wireless service provider. Similarly, in the receive direction, the relatively low energy signal generated by the mobile device for establishing the reverse link is well below the receiver sensitivity of the service provider network (e.g., an eNode B component for enabling long-term evolution (LTE) communication). Consequently, the mobile device may not be able to link the provider during the flight.

Another issue that limits network access during air travel is the configuration of most cellular sites. Typically, the antennas of a cell site are configured to transmit horizontally focused signals. Hence, the majority of the energy generated at the base station is focused outward horizontally from the tower for being received by mobile devices on the ground rather than those in the air. Although there is some vertical side lobe energy generated, it is a byproduct of the ground-focused beam design of the antenna. Most vertically directed beams are inconsistent or not uniform and therefore do not provide quality coverage to an aircraft at elevation. Also, the speed of the airplane is too rapid for conventional RAN (radio access network) technologies of a base station/cell site to properly establish a cellular link due to inherent interference, Doppler shift, etc.

Therefore, the approach of system 100, according to certain exemplary embodiments, stems from the recognition that mobile device users can benefit from high speed network access during air travel. This reliability includes, for example, enabling the scanning (detecting of) and tracking of aircraft 107 within range of a high gain, steerable antenna of a cell site (e.g., antenna 121 of FIG. 1B). This may include, for example, observing forward link reflections, i.e., signals transmitted from the base station that reflect off aircraft and are detected by ground stations. Based on the reflection, the system 100 may determine accurate position information for the aircraft 107 for continuous tracking and directing of high gain signals. Also, per the system 100, the high gain signals may be directed towards the aircraft 107 as it travels through airspace to make up for the low gain on the reverse link signal, i.e., the signal from user devices 101a-101n as directed to a cell site 123 of a network service provider associated with the user.

Still further, the system 100 may employ various frequency compensation techniques for overcoming the connectivity limitations caused by the apparent airplane velocity. As will be discussed further later on herein, this may include employing different signal transformation calculations (e.g., Fourier transformations) along with Doppler frequency shift compensation. Once applied, the system 100 may identifying a correct or best frequency intensity to generate at the cell site 123 relative to the movement of the aircraft 107 for maintaining a continuous connection (link) between the cell site 123 and the different user devices 101a-101n aboard the aircraft during air travel.

It is noted that user devices 101a-101n, referred to herein collectively as user devices 101, may be any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), smartphone or any combination thereof. It is also contemplated that the user devices 101 can support any type of interface for supporting the presentment or exchanging of data. In addition, user devices 101 may feature one or more sensors 102 for generating device signals for connecting with a communication network. For example, the sensors 102 may include one or more antennas, receivers and/or transmitters for enabling reverse link connection to a nearby cell site of a service provider within range of the user device 101. Hence, the user devices 101 may be detected, or "picked up," by a cell site as it broadcasts its device signal (and network credentials) accordingly.

In one embodiment, the system 100 includes a control platform 103 that is configured to interact with and control one or more network elements 105 of a communication network for enabling the detecting and linking of said user devices 101 with a broader communication network during air travel. The control platform 103 may introduce one or more frequency compensation functions, antenna control functions, aircraft presence and movement tracking capabilities and the like to the communication network. By way of example, the control platform 103 may interface with the network elements 105 for submitting control signals to affect the operation of the communication network for accommodating device usage during air travel. While depicted herein for example purposes as a separate entity, the control platform 103 may be directly integrated within a communication network as one or more network elements 105.

Alternatively, the control platform 103 may be executed as a platform or network hosted solution for submitting control signals accordingly via a network connection. In either implementation, the control platform 103 may directly interact with the network elements 105 by way of one or more known or still developing base station/cellular network interface protocols and techniques. This may include, for example, the common public radio interface (CPRI), the open base station architecture initiative (OBSAI), or a combination thereof.

For the purpose of illustration, the communication network, referred to herein as service provider network 111, may include a data network 109, a telephony network 113, a wireless network 115, or a combination thereof. The one or more networks may be provided by a service provider associated with users of user devices 101. As such, the service provider provides the network infrastructure, consisting of various network elements 105, for enabling network communication by respective user devices 101. User devices 101 may access the network according to a service agreement, access credentials, or the like, wherein the access corresponds to the availability of network signals and respective cell sites for providing said signals.

The service provider network 111 may be any suitable wireline and/or wireless network. For example, telephony network 113 may include a circuit-switched network, such as the public switched telephone network (PSTN), an integrated services digital network (ISDN), a private branch exchange (PBX), or other like network. Wireless network 115 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 109 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 109-115 may be completely or partially contained within one another, or may embody one or more of the aforementioned infrastructures. For instance, service provider network 111 may embody circuit-switched and/or packet-switched networks that include facilities to provide for transport of circuit-switched and/or packet-based communications. It is further contemplated that the service provider network 111 includes various components and facilities, referred to herein as network elements 105, for providing signaling and/or bearer communications between various components or facilities of system 100. In this manner, the service provider network 111 may embody or include portions of a signaling system 7 (SS7) network, or other suitable infrastructure to support control and signaling functions. As such, the conjunction of networks 109-115 may be adapted to facilitate the system 100.

Figure 1B:
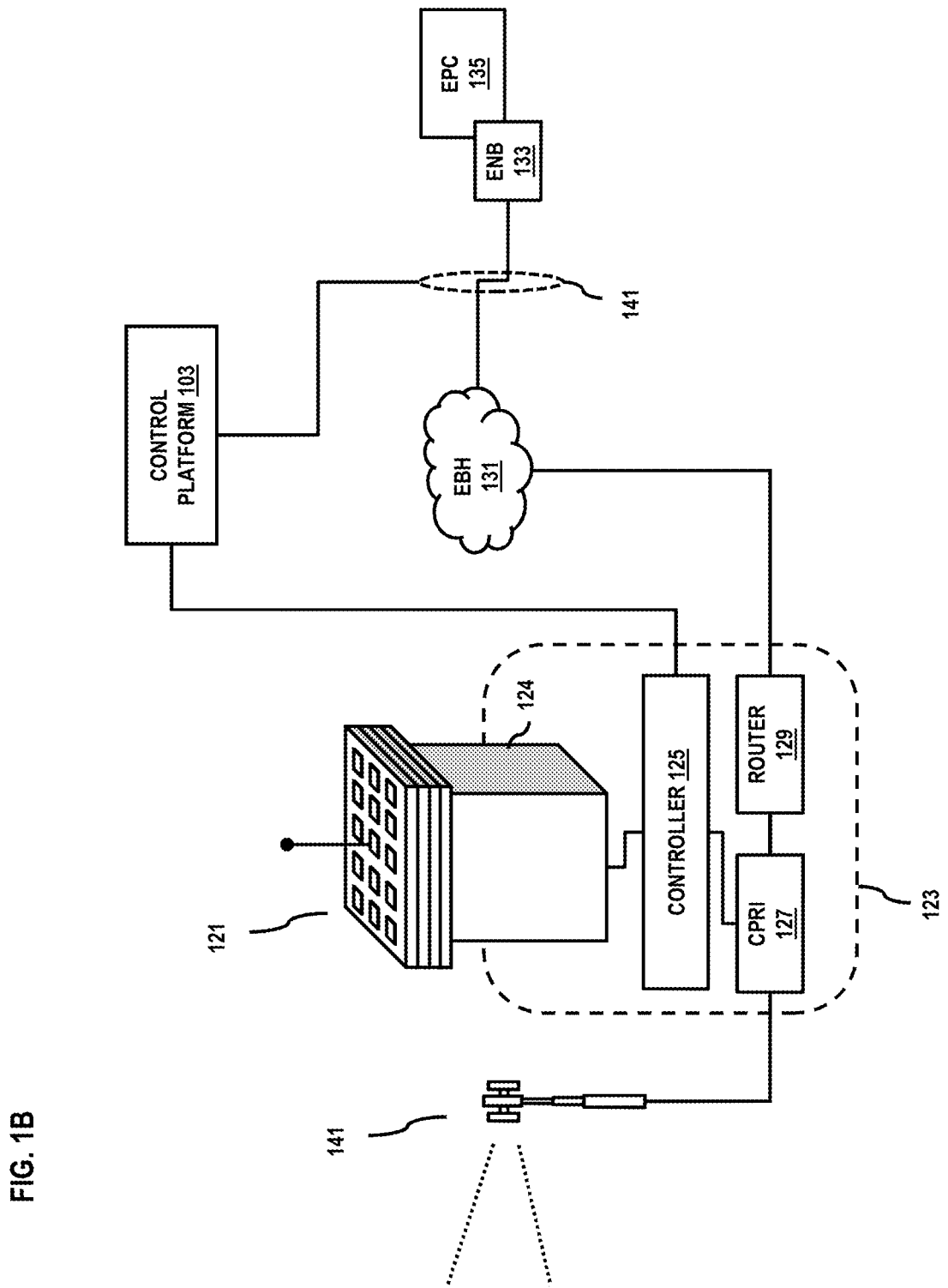
FIG. 1B is a diagram of elements of a communication network, according to one embodiment.

As depicted in FIG. 1B, the service provider network 111 may comprise various network elements 105 for enabling generation of signals to support network/data access by the user devices 101 during high speed travel (e.g., air travel). In one embodiment, this may include for example, one or more cell sites 123 featuring a high gain, steerable, phased array antenna 121. The phased array antenna 121 may be vertically directed towards open airspace for transmitting signals to and receiving signals from user devices 101 within an aircraft 107. Also, the phased array antenna 121 may include multiple array elements, wherein each array element is capable of generating and transmitting signals of varying intensity and/or gain levels. The number of array elements may vary depending on the dimensions/footprint of the rooftop of a tower 124 upon which the antenna 121 is positioned. Hence, the maximum gain of the phased array antenna 123 may depend on the collective gain achieved by the individual array elements, wherein more roof space enables the placement of more array elements.

In one embodiment, each element of the phased array antenna 121 may be electronically controlled by way of a controller module 125 of the cell site 123. The electronic control may correspond to a "steering" of the phased array antenna. By way of example, the phase of each array element of the antenna 121 may shifted by the controller 125 for affecting the direction of the signal generated by each array element. The direction of the signal of the antenna 123 may therefore be programmatically controlled by adjusting the phase of each element. In addition, the controller 125 may affect the gain, signal/beam width, the number of antenna partition and the like as a result of or in addition to the directionality of the signals. For the purpose of illustration, the collective gain of the antenna 123 may be determined according to any known gain and/or signal power functions, including those determined a function of the wavelengths of the signals generated by respective array elements, the diameter of the array elements of the antenna 121, their relative distances from one another as placed upon a roof space of the tower 124, etc.

It is noted that use of a high gain antenna 121 results in generation of a highly focused signal with a narrow beam width. Thus, by controlling the direction and/or steering of the antenna via the controller 125, the tightly focused signal may be pointed directly to the aircraft 107. Furthermore, the controller 125 may continue to adapt the phase of respective array elements of the antenna 121 for continual steering as the aircraft 107 moves about through open airspace. It is noted that the controller 125 may interact with or be implemented directly as the control platform 103 for enabling programmable control of the phased array antenna 121 in response to the presence and movement of an aircraft 107.

The cell site 123, also referred to as a base station, may also feature various common public radio interface (CPRI) modules 127. This may include, for example, radio equipment controllers, radio heads/units 141, optical connectors and/or corresponding fiber cabling, etc. The radio equipment and radio units may further include one or more sets of transmitter/receivers (transceivers), digital signal processors, control electronics, a global positioning system (GPS) receiver for timing (for CDMA2000/IS-95 or global system for mobile (GSM) systems), primary and backup electrical power sources and sheltering. As noted previously, the CPRI modules 127 may be compliant with the CPRI standard for enabling convenient interfacing or linking of said modules 127 with one another or any radio frequency units per a standard set of protocols and/or connection requirements.

The cell site 123 may also feature one or more routers 129 for supporting mobile network topologies such as long-term evolution (LTE) or the like. By way of example, the routers 129 may connect to an Ethernet backhaul (EBH) for linking the cell site 123 to an LTE network, also referred to herein as an evolved packet core (EPC) 135. While not shown herein, the EPC 135 may include various nodes for enabling LTE signal generation, including one or more gateways (e.g., serving gateways, PDN gateways, packet data gateways), servers (e.g., home subscriber servers), mobility management entities (MMEs), etc. In addition, the EPC 135 may include one or more E-UTRAN Node B (eNode Bs or eNBs), which is hardware for communicating directly with user devices 101. Still further, the EPC 135 may interface with a public network, such as the Internet (e.g., 111) or public telephone network (e.g., 113).

In one embodiment, the control platform 103 interfaces with the controller 125 of the cell site 123 as well as the EPC 135 by way of CPRI interfacing means. Hence, control signals may originate from the control platform 103 and be passed to the controller 125 per a CPRI messaging protocol accordingly. Similarly, the control platform 103 may perform one or more logical application executions for direct integration with the eNB 133 of the EPC 135 per a CPRI connection/interface 143. As will be discussed further in FIG. 2, the control platform 103 may include various modules for enabling an existing LTE based network and interlinked cell sites 123 to be configured with functions for supporting scanning (detecting) and tracking of aircraft 107, signal processing and frequency compensation and associated gain control and adjusting.

Figure 2:
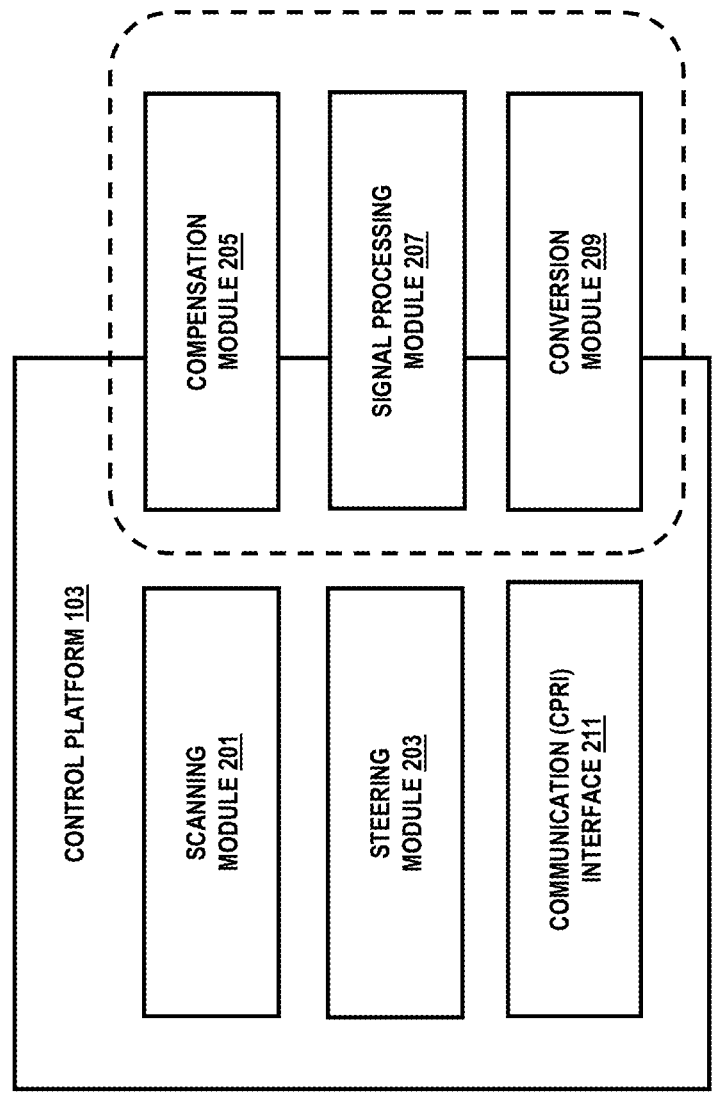
FIG. 2 is a diagram of a control platform, according to one embodiment.

FIG. 2 is a diagram of a control platform, according to one embodiment. The control platform (platform) 103 includes various executable modules 201-211 for performing one or more computing, data processing and network based instructions that in combination provide a means of restricting the use of mobile devices. Such modules can be implemented in hardware, firmware, software or a combination thereof. For example, the modules 201-211 may be implemented as control executions for use in connection with different common public radio interface (CPRI) modules (e.g., LTE equipment) of a service provider network 111. In addition, the modules 201-211 may be implemented as one or more logic functions for direct interaction with existing CPRI compliant circuitry and/or components of a cell site 123, an EPC 135, etc. The communication interface 211 of the control platform 103 may facilitate the connection between the platform 103 and the various CRPI modules.

By way of example, the platform 103 may include a scanning module 201 for scanning airspace for aircraft 107 that may contain one or more user devices 101. Under this scenario, the scanning module 201 may initiate generation of scan signals for detecting the presence and movement of aircraft 107 within an airspace. The presence determination may include analyzing a response, or bounce back, of a scan signal initiated by the phased array antenna 121 while the movement determination may include determining a relative speed, direction, flight path or other characteristic of the aircraft 107. Still further, the scanning module 201 may determine an azimuth or elevation angle of the aircraft 107 relative to the location of the antenna 121, the beam width of the scan signal, etc.

In one embodiment, the scanning module 201 initiates transmission of a continuous scan signal of frequency Fs from the phased array antenna 121 at a wide beam width (e.g., corresponding to a specific angle of incidence). In addition, the scanning module 201 operates in connection with the steering module 203 to enable 360 degree azimuth rotation of the antenna. Hence, the scanning module 201 may interact with various transceivers, amplifiers, filters and other components of the Per this execution, the steering module 203 adjusts the phase of the respective array elements of the antenna 121 360 degrees according to a timing set forth by the scanning module 203. This results in shifting of the direction of the scan signal continuously in a conically shaped fashion to produce a scan region as depicted by way of example in FIG. 3A.

Figure 3A:
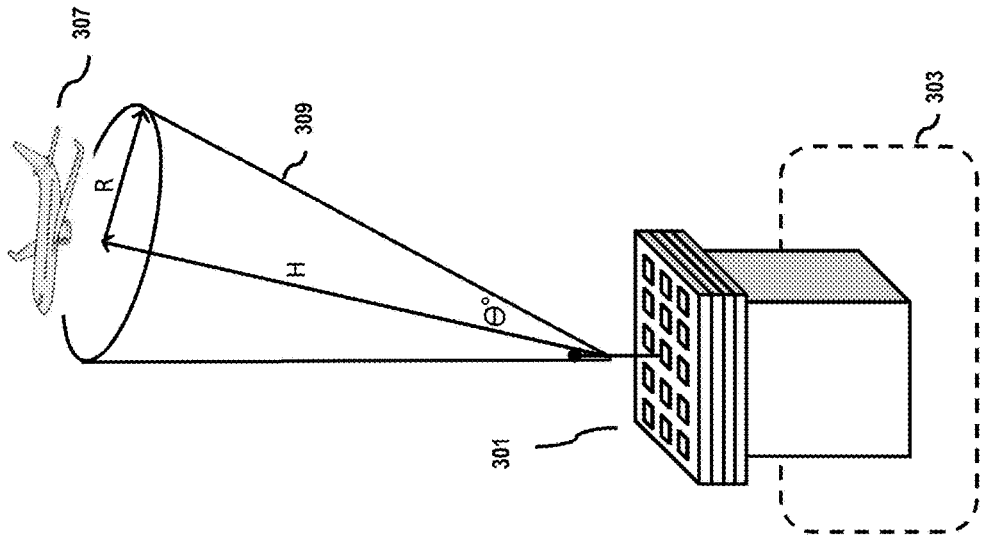
FIGS. 3A-3C are diagrams depicting the scanning and tracking of an aircraft by a phased array antenna, according to various embodiments.

In FIG. 3A, a phased array antenna 301 of a cell site 303 generates the scan region, which is depicted as a cone 305. The cone is defined by a height (or altitude) H and radius R, such that relationship between the scan region 305 and phase shift is approximated as follows:

$$R = A * \tan(\theta);$$

θ (as expressed in degrees) corresponds to a phase shift set by the steering module 203 for affecting the direction and/or angle of incidence of the scan signal from the phased array antenna 301 while R is established per the rotation. By way of example, as shown in TABLE 1 below, a scan region of an altitude of 35,000 feet with phase shift setting of 60 degrees may be determined to correspond to an overhead distance (e.g., 60,622 feet), a signal time overhead (e.g., 0.019 hours, 68.89 seconds), a bandwidth consumption amount (e.g., 21.16 megabytes), etc.

TABLE 1

| | |
|---|---|
| Altitude: | 35,000 feet |
| distance overhead: | 60,622 feet |
| distance overhead: | 11.48 Miles |
| Time overhead: | 0.019 hours |
| Time overhead: | 68.89 seconds |
| Bytes consumed overhead: | 21,162,512 Bytes |
| Megabytes consumed: | 21.16 MB |

It is noted that the scanning module 201 may perform the above mentioned calculations and others according to any known geometric determination approaches, signal modeling and approximation techniques or the like. Also, for the purpose of illustration herein, the scan region 305 may correspond to the entirety of the cone or the region corresponding to the base of the cone. With the continuous rotation of the phased array antenna 301 according to a timed adjustment (clock setting) along with continuous transmission of the scan signal at frequency Fs, any incoming and/or outgoing aircraft 307 to and from the scan region 305 may be detected. Under this scenario, when the scan signal contacts an aircraft 307 moving through the scan region 305 according to a velocity vector V, the frequency of the signal at the plane is Fs+Fd, where Fd is the Doppler shifted frequency.

In one embodiment, the scan module 201 also senses a return signal resulting from transmission of the scan signal Fs as it makes contact with an aircraft 307. The return signal may be a bounce back signal received by the phased array antenna 301 that is shifted by an additional frequency 2Fd, wherein the shift is due to the additional Doppler shift resulting from roundtrip travel of the signal Fs. Receipt of the signal indicates the potential presence of aircraft 307 within the scan region 305.

Figure 3B:
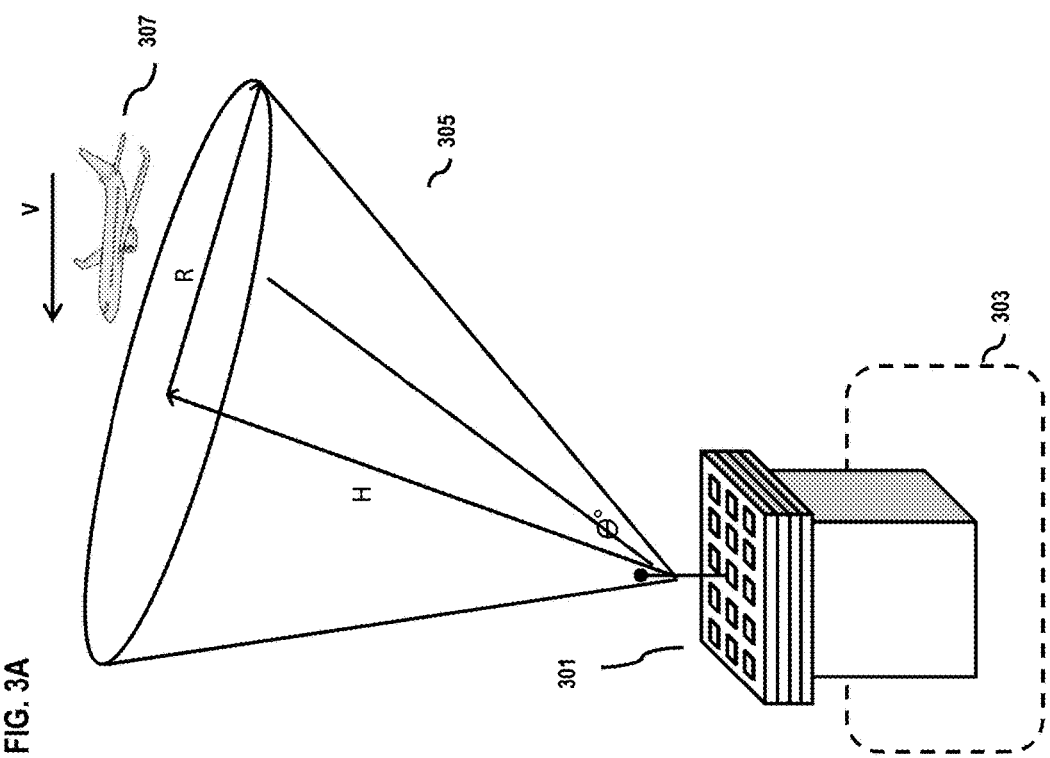

In order to validate the presence and/or movement of the aircraft 307 within range, the scanning module 203 initiates a control signal for the transmitter of the phased array antenna 301 to collapse the beam width (e.g., by 50%). This causes a more narrowly focused scan region 309 to be generated for honing in on the aircraft 307 as depicted in the exemplary embodiment of FIG. 3B. The return signal (Fs1) resulting from transmission of the scan signal Fs per the reduced beam width 305 is also recorded. In addition, the scanning module 203 records another return signal Fs2 resulting from subsequent transmission of the scan signal Fs around the axis of the collapsed beam. The scanning module 203 further compares return signal Fs1 and Fs2 to determine whether the frequencies align around the axis and further narrows the scan region 305 accordingly.

It is noted that the above described scanning process may be performed multiple times until the specific location of the aircraft 307 is determined. In certain implementations, the scanning module 203 may also perform various mono-pulse tracking approaches, including phase comparison and amplitude comparison of the respective return signals Fs1 and Fs2. Any known signal/frequency based scanning and detection techniques may be employed accordingly.

Figure 3C:
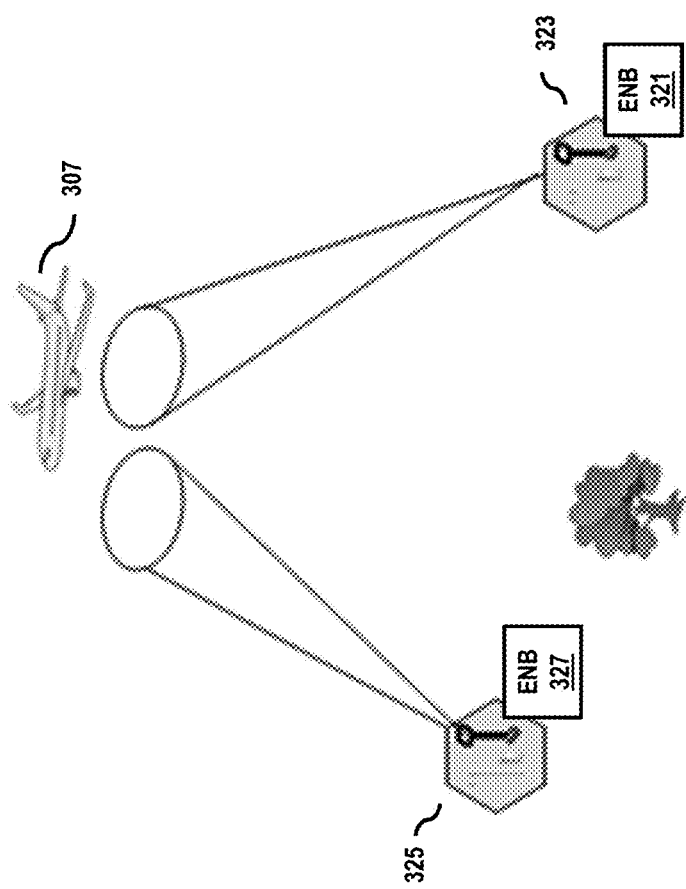

In another embodiment, the scanning module 203 may also enable execution of a handover procedure for continuity of an established connection between a user device 101 aboard the aircraft 307 and the base station/cell site 301. The handover procedure is depicted, for example purposes, in FIG. 3C. The procedure may include facilitating the sending of frequency/gain measurement reports from the user device 101 to an eNode B (eNB) 321 associated with a first cell site 323 per a steady state tracking connection. Once the eNB 321 issues a handover command based on the report results, the connection between the first cell site 323 and a user device within the aircraft 307 is assigned to a second cell site 325. The second cell site 325 then continues active tracking of the aircraft 307 and generation the signal for enabling the connection (e.g., per its associated eNB 327). It is noted the report data may be analyzed by the scanning module 203, in conjunction with the eNB 321 for determining if a handover condition is met. This may include, for example, determining an extent of change in location, speed, position, elevation or movement of the aircraft 307 relative to the first cell site 323 and/or the second cell site 325.

In one embodiment, the scanning module 201 of the control platform 103 may be configured to generate scan signals Fs at varying frequencies. Under this scenario, scan frequencies may be differentiated amongst different cell sites 301, LTE/EPC networks 135, etc. By way of example, unique frequencies may be assigned to a specific base station/cell site 301 (e.g., guard band) or the assignment may be based on amplitude shift keying—i.e., a 16 bit key established per base station/cell site 301. As another example, separate LTE frequency bands may be established for corresponding to the identifiers of individual eNode B devices.

In another embodiment, the compensation module 205 and signal processing module 207 operate in connection with one another to perform forward and reverse link frequency compensation. By way of example, the compensation is performed subsequent to detection of an aircraft for determining a frequency/gain of a signal to be transmitted by the phased array antenna for enabling user devices 101 within the aircraft to connect with the service provider network; especially for accessing a high speed edge network. In addition, the compensation is performed in order to overcome the high speed signaling limitations caused by the high velocity V of the aircraft as well as any interference factors (e.g., Doppler shift) that result in low gain forward or reverse link signal generation.

In one embodiment, in response to receipt of the return signal (e.g., bounce back/reflection signal from the aircraft 307) as per the scanning module 203, the signal processing module 207 determines the amount of frequency shift (Fd) associated with the signal. By way of example, this includes processing the return signal using a Fast Fourier Transformation (FFT) or Inverse Fast Fourier Transformation (IFFT) or other calculation. This execution may be triggered by the scanning module 203 upon receipt of the return signal at a receiver of the phased array antenna. Once the frequency shift (Fd) is calculated, this value is then provided by the signal processing module 207 to the compensation module 205.

In one embodiment, the compensation module 205 determines the compensatory frequency (Fc) that must be applied to generate a forward link signal (Fp) of enough gain to establish a connection with a user device 101. By way of example, the compensation module 205 divides the determined frequency shift (Fd) by 2 to account for the reflection (2Fd). The compensation module 205 then subtracts this value (Fd) from the forward link signal to compensate for any Doppler shift. Thus, per the compensation, the compensation module 205 instructs the transmitter of the phased array antenna to transmit the forward link signal of frequency (Fp) less the determined compensatory frequency (Fc), i.e., generation of a signal Fp–Fc. In addition, the compensation module 205 also determines the reverse link signal (Rp). By way of example, the reverse link signal is determined by subtracting the shift frequency (Fd) from the signal received by the phased array antenna.

In one embodiment, a conversion module 209 may be configured to process the forward (Fp) and reverse link (Rp) signals according to known signal conversion techniques. This may include, for example, serial-to-parallel conversion, parallel-to-serial conversion, digital-to-analog conversion, analog-to-digital conversion, etc. The conversion module 209 may be applied to the reverse and forward link signals produced by the compensation module for tuning, normalizing or modulating the signals. It is noted the conversion performed may be based upon the circuitry requirements of the (CPRI) modules (e.g., LTE equipment/evolved packet core network (EPC)) of the service provider network 111.

Once the compensation has been applied by the compensation module 205 and tuned accordingly by the conversion module 209, the signal is then presented to the transmitter of the phased array antenna. Resultantly, the user device 101 in the aircraft 307 that is still being continuously tracked per the scan signal Fs, now receives the forward link (Fp) signal. In addition, the eNB associated with the cell site/evolved packet core network receives the reverse frequency link (Rp). The corrected or optimal frequency, with appropriate gain, is generated for as long as the aircraft stays within range of the phased array antenna, subject to handover by the scanning module 201 when necessary.

The above presented modules and components of the control platform 103 can be implemented in hardware, firmware, software, or a combination thereof. As mentioned previously, these modules may be directly integrated with a CPRI module via known interfacing means. Also, while shown as a collective, it is noted the modules may be integrated within the cell site or EPC in a distributed fashion. As such, different modules may interface with different components of the cell site of EPC accordingly. For example, one or more of the compensation module 205, signal processing module 207 and conversion module 209 may be integrated within the radio equipment portion of a CPRI module per the communication interface 211 for enabling Doppler-shift compensation to be applied. Alternatively, one or more of the modules may be integrated within an eNB or component of the cell site for achieving the same end. Thus, the control platform 103 may be readily adapted and configured for use in connection with any existing network infrastructure for executing high-speed, high bandwidth communication, as depicted in FIG. 3D.

Figure 3D:
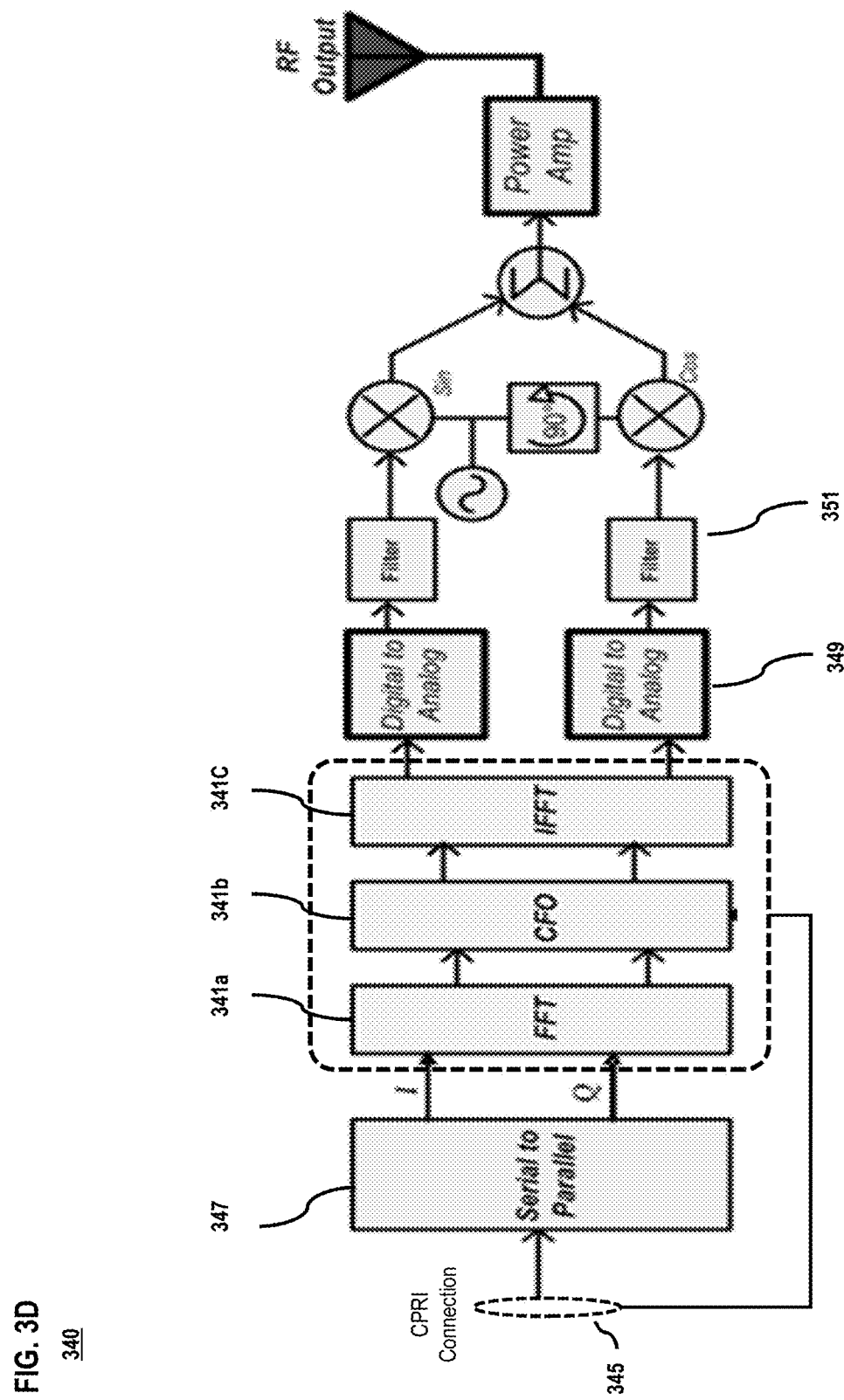
FIG. 3D is a block diagram depicting interaction between elements of a communication network for providing broadband network access to mobile devices within an aircraft, according to one embodiment.

In FIG. 3D, a block diagram of the Doppler-Shift Compensator Function (DSCF) as enabled per execution of the compensation module 205 and signal processing module 207 is shown. In this example, the modules are integrated within the RE portion 340 of a CPRI Radio of a service provider for equipping said radio to perform reverse and forward link signal compensation to handle the high aircraft velocity. The service provider integrates the control platform 103, and in this case, specific modules thereof via CPRI interfacing means (e.g., as depicted by the CPRI connection 345).

In one embodiment, the signal processing module 207 processes return signals received by the radio using FFT and IFFT calculations, thus enabling the functions of block elements 341a and 341c. Also, the frequency compensation function per block element 341b of the radio equipment is performed by the compensation module 205. While not shown in this example, it is noted the conversion module 209 may be integrated into the CPRI compliant equipment as needed, such as to perform the parallel-to-serial conversion, digital-to-analog conversion or signal filtering functions of block elements 347, 349 and 351 respectively. Once integrated, the radio equipment may operate as a standalone module that can be further connected to any eNB or base band unit having the appropriate CPRI interfaces and/or meeting the CPRI protocol standards.

By way of this integration, the CPRI module (e.g., the radio equipment) may account for variations in the movement of an aircraft. For example, when the plane is flying towards the phased array antenna, the return signal frequency must be shifted down since the oncoming wave form is compressed (blue shifted). This can be accomplished via interaction of the modules of the platform 103 as described above by slightly decreasing the frequency of the sub-channels of the signal via a FFT (e.g., per module 207), applying the frequency compensation (e.g., per module 205), then applying the Inverse FFT to the data (e.g., per module 207). In the case where the plane is moving away from the phased array antenna, then the opposite execution is performed for shifting the signal frequency up rather than down.

It is noted that the velocity and direction of the aircraft is typically not known. However, per the scanning and tracking capabilities of the control platform 103 (e.g., to enable radar like tracking), the velocity and overall movement of the aircraft may be determined. In addition, the frequency shift caused by the high velocity of the aircraft can be effectively cancelled via the compensation process. Resultantly, a forward and reverse link signal may be appropriately established between a high gain, phased array antenna (upwardly directed), and user devices aboard the moving aircraft.

Figure 4C:
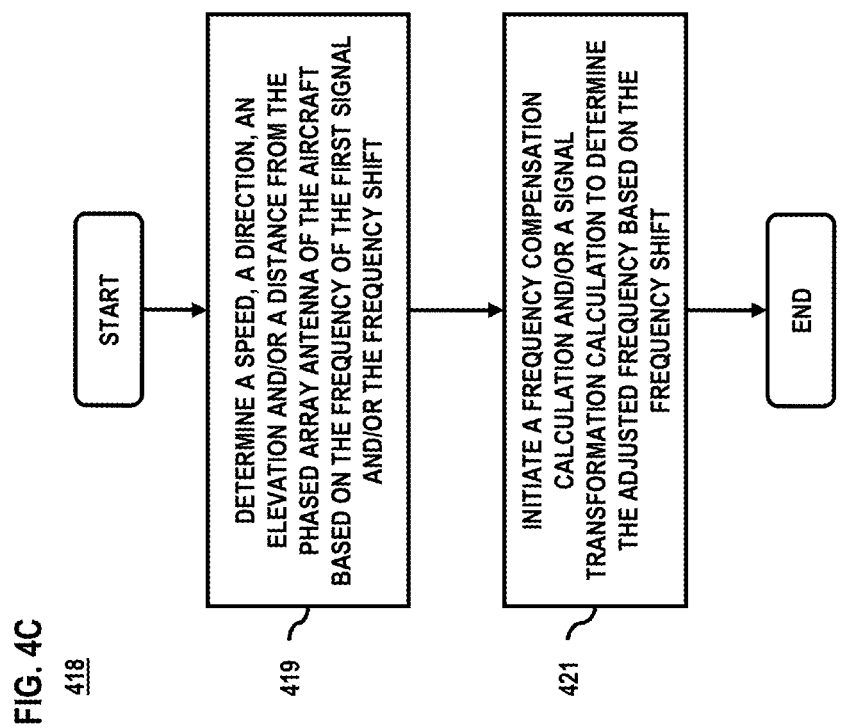

FIGS. 4A-4C are flowcharts of processes for providing broadband network access to mobile devices during air travel, according to one embodiment. For the purpose of illustration, the processes are described with respect to FIGS. 1A-1B. It is noted that the steps of the process may be performed in any suitable order, as well as combined or separated in any suitable manner. In one embodiment, the processes are performed by the control platform 103 independently or in conjunction with an integrated CPRI module (e.g., within a service provider network).

In step 400, the control platform 103 transmits a first signal from a phased array antenna towards an airspace. The first signal may correspond to a scan signal for tracking and/or determining the presence of one or more aircraft within range of the phased array antenna 121. In another step 403, the platform 103 steers the phased array antenna towards an aircraft 107 within the airspace based on a determined movement of the aircraft 107, a device signal generated by a mobile device (user device 101) aboard the aircraft 107, or a combination thereof. The device signal generated by the mobile device 101 may be a low energy device detection signal, a reverse link broadcast signal, or the like for establishing/initiating a connection (link) with a carrier frequency signal of a service provider associated with the mobile device 101.

In step 405, the control platform 103 determines a frequency shift associated with a return of the first signal from the aircraft 107. As noted previously, the frequency shift may correspond to a Doppler shift caused by the high speed movement of the aircraft 107 within the airspace. In another step 407, the platform 103 determines a second signal of a different frequency based on the frequency shift. Per step 409, the platform 103 transmits the second signal to the aircraft. As mentioned previously, the second signal may be of a different frequency than the first signal (e.g., a scan signal) for providing enough gain for the mobile device 101 to access a communication network of a communication service provider from the aircraft 107.

In step 411 of process 410 (FIG. 4B), the control platform 103 determines a presence, a movement, or a combination thereof of the aircraft 107 within the airspace to within a predetermined range of the phased array antenna 121 based on the first signal. By way of example, the predetermined range is based on a physical characteristic of the phased array antenna 121, a scan region generated as a result of the steering of the phased array antenna during transmission of the first signal, or a combination thereof. The physical characteristics may include the number of array elements of the phased array antenna 121, collective gain of the signal, etc.

In another step 413, the control platform 103 determines an adjusted direction of the first signal based on the presence, the movement, or a combination thereof of the aircraft 107 relative to the phased array antenna 121. As noted, the steering of the phased array antenna 121 is based on the adjusted direction. Also, the adjusted direction is implemented by changing a phase of one or more array elements of the phased array antenna 121. This corresponds to an electrical steering of the phased array antenna as opposed to a physical movement of the array elements about the tower 124.

In step 415, the control platform 103 determines a subsequent presence, a subsequent movement, or a combination thereof of the aircraft 107 to within range of another phased array antenna. In another step 417, the platform 103 transmits the second signal to the another phased array antenna based on the subsequent presence, the subsequent movement, or a combination thereof. As mentioned previously, this may correspond to a handover procedure of the platform 103 as performed in connection with a network component 105 of the communication network (e.g., an eNode B device).

Per step 417, the control platform 103 determines a speed, a direction, an elevation, a distance from the phased array antenna, or a combination thereof of the aircraft 107 based on the frequency of the first signal, the frequency shift, or a combination thereof. As noted previously, the phased array antenna is steered based on the speed, the direction, the elevation, the distance from the phased array antenna, or a combination thereof. It is further noted that the first signal (scan signal) is generated in association with (a) a base station, a cellular site, or a combination thereof of the communication service network; (b) a frequency band established by the communication service provider; or (c) a combination thereof for determining the presence, the movement, or a combination thereof of the aircraft 107.

In step 419 of process 418 (FIG. 4C), the control platform 103 determines a speed, a direction, an elevation, a distance from the phased array antenna, or a combination thereof of the aircraft 107 based on the frequency of the first signal, the frequency shift, or a combination thereof. The phased array antenna is steered based on the speed, the direction, the elevation, the distance from the phased array antenna, or a combination thereof. In another step 421, the platform 103 initiates a frequency compensation calculation, a signal transformation calculation, or a combination thereof to determine the adjusted frequency based on the frequency shift. As noted previously, the second signal is generated based on the results of the frequency compensation calculation, the signal transformation calculation, or a combination thereof. Still further, the frequency compensation calculation, the transmission of the first signal, the transmission of the second signal, or a combination thereof is executed in connection with an interface to a baseband unit, a radio equipment controller, radio equipment, or a combination thereof associated with the communication service network.

It is noted that the control platform 103 may also be configured to execute additional functions in connection with the baseband unit, radio equipment controller, radio equipment, or a combination thereof. For example, the control platform 103 may perform signal conversion, signal filtering, frequency compensation timing and frequency tuning in accordance with the requirements of the communication service network. Hence, the above described executions of the platform 103 may be adapted to accommodate different equipment configurations accordingly.

The processes described herein for providing broadband network access to mobile devices during air travel may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
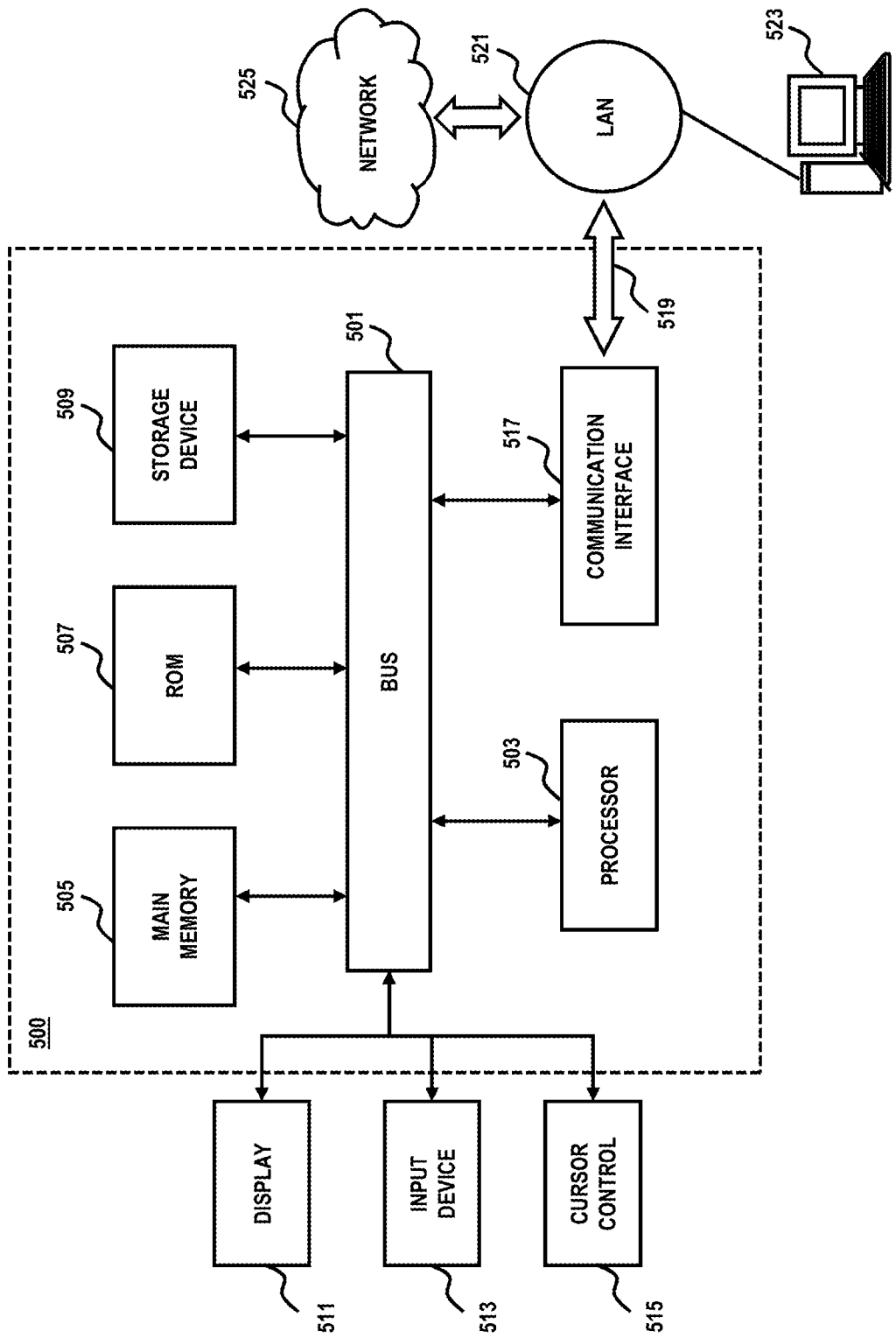
FIG. 5 is a diagram of a computer system that can be used to implement various exemplary embodiments.

FIG. 5 is a diagram of a computer system that can be used to implement various exemplary embodiments. The computer system 500 includes a bus 501 or other communication mechanism for communicating information and one or more processors (of which one is shown) 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for adjusting cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multiprocessing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 6:
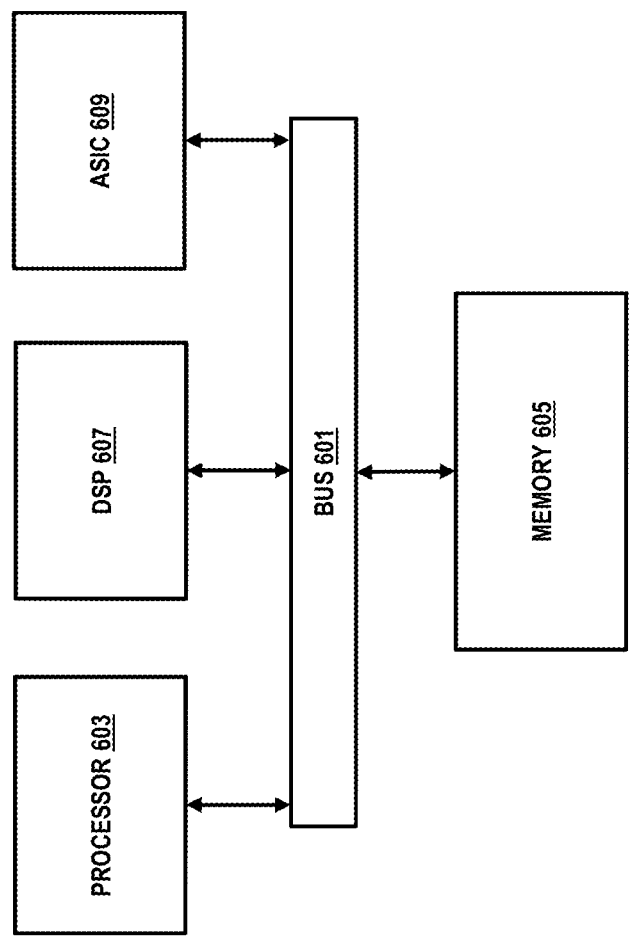
FIG. 6 is a diagram of a chip set that can be used to implement various exemplary embodiments.

FIG. 6 illustrates a chip set or chip 600 upon which an embodiment of the invention may be implemented. Chip set 600 is programmed to provide broadband network access to mobile devices during air travel as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing broadband network access to mobile devices during air travel.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to provide broadband network access to mobile devices during air travel. The memory 605 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements

What is claimed is:

1. A method comprising:
   transmitting a first signal from a phased array antenna towards an airspace;
   steering the phased array antenna towards an aircraft within the airspace based on a device signal generated by a mobile device aboard the aircraft,
   wherein the first signal is reflected off of the aircraft;
   receiving the first signal after the first signal has reflected off of the aircraft;
   determining a frequency shift associated with the received reflected first signal;
   determining a second signal of a second frequency that is different than the first frequency, based on the frequency shift; and
   transmitting, via the phased array antenna, the second signal to the mobile device, the second signal being transmitted in a direction that is based on the steering, and wherein a gain of the second signal is based on the determined second frequency.

2. The method of claim 1,
   wherein the second signal provides enough gain for the mobile device to access a communication network of a communication service provider from the aircraft.

3. The method of claim 1, further comprising:
   determining at least one of a presence or a movement of the aircraft within the airspace to within a predetermined range of the phased array antenna based on the first signal,
   wherein the predetermined range is based on at least one of:
      a physical characteristic of the phased array antenna, or
      a scan region generated as a result of the steering of the phased array antenna during transmission of the first signal.

4. The method of claim 3, further comprising:
   determining an adjusted direction of the first signal based on the presence, the movement, or a combination thereof of the aircraft relative to the phased array antenna,
   wherein the steering of the phased array antenna is based on the adjusted direction, and wherein the adjusted direction is implemented by changing a phase of one or more array elements of the phased array antenna.

5. The method of claim 3, further comprising:
   determining at least one of a subsequent presence or a subsequent movement of the aircraft to within range of another phased array antenna; and
   transmitting the second signal to the mobile device via the other phased array antenna.

6. The method of claim 3, wherein the first signal is generated in association with at least one of a base station or a cellular site of the communication service network.

7. The method of claim 1, further comprising:
   determining, based on the frequency shift, at least one of:
      a speed of the aircraft,
      a direction of movement of the aircraft,
      an elevation of the aircraft, or
      a distance of the aircraft from the phased array antenna,
   wherein the phased array antenna is steered based on the at least one of the determined speed, the direction, the elevation, or the distance from the phased array antenna.

8. The method of claim 1, further comprising:
   initiating a frequency compensation calculation to determine the adjusted frequency based on the frequency shift,
   wherein the second signal is generated based on a result of the frequency compensation calculation.

9. The method of claim 8, wherein the transmission of the first signal and the transmission of the second signal are executed in connection with an interface to at least one of a baseband unit or a radio equipment controller associated with the communication service network.

10. The method of claim 1, wherein determining the frequency shift, associated with a return of the first signal from the aircraft, includes:
    performing at least one of a Fast Fourier Transformation, or an Inverse Fast Fourier Transformation calculation, on the return of the first signal from the aircraft.

11. An apparatus comprising a processor configured to:
    transmit a first signal from a phased array antenna towards an airspace;
    steer the phased array antenna towards an aircraft within the airspace based on at least one of a determined movement of the aircraft or a device signal generated by a mobile device aboard the aircraft;

determine a frequency shift associated with a return of the first signal from the aircraft, the first signal being detected by the apparatus after having reflected off of the aircraft;

determine a second signal of a second frequency, that is different from the first frequency, based on the frequency shift; and transmit, via the phased array antenna, the second signal to the mobile device, the second signal being transmitted in a direction that is based on the steering, and wherein a gain of the second signal is based on the determined second frequency.

12. The apparatus of claim 11,
wherein the second signal provides enough gain for the mobile device to access a communication network of a communication service provider from the aircraft.

13. The apparatus of claim 11, wherein the processor is further configured to:
determine at least one of a presence or a movement of the aircraft within the airspace to within a predetermined range of the phased array antenna based on the first signal,
wherein the predetermined range is based on at least one of:
a physical characteristic of the phased array antenna, or
a scan region generated as a result of the steering of the phased array antenna during transmission of the first signal.

14. The apparatus of claim 13, wherein the processor is further configured to:
determine an adjusted direction of the first signal based on the presence, the movement, or a combination thereof of the aircraft relative to the phased array antenna,
wherein the steering of the phased array antenna is based on the adjusted direction, and wherein the adjusted direction is implemented by changing a phase of one or more array elements of the phased array antenna.

15. The apparatus of claim 13, wherein the processor is further configured to:
determine at least one of a subsequent presence or a subsequent movement of the aircraft to within range of another phased array antenna; and
transmit the second signal to the mobile device via the other phased array antenna.

16. The apparatus of claim 11, wherein the processor is further configured to:
determine, based on the frequency shift, at least one of:
a speed of the aircraft,
a direction of movement of the aircraft,
an elevation of the aircraft, or
a distance of the aircraft from the phased array antenna,
wherein the phased array antenna is steered based on the at least one of the determined speed, the direction, the elevation, or the distance from the phased array antenna.

17. The apparatus of claim 11, wherein the processor is further configured to:
initiate a frequency compensation calculation, a signal transformation calculation, or a combination thereof to determine the adjusted frequency based on the frequency shift,
wherein the second signal is generated based on a result of the frequency compensation calculation, the signal transformation calculation, or a combination thereof.

18. The apparatus of claim 17, wherein the frequency compensation calculation is executed in connection with one or more devices associated with the communication service network.

19. A system comprising:
a platform configured to:
transmit a first signal from a phased array antenna towards an airspace;
steer the phased array antenna towards an aircraft within the airspace based on at least one of:
a determined movement of the aircraft, or
a device signal generated by a mobile device aboard the aircraft;
detect a return of the first signal after the first signal has reflected off of the aircraft;
determine a frequency shift associated with the detected return of the first signal from the aircraft;
determine a second signal of a second frequency, that is different from the first frequency, based on the frequency shift and
transmit, via the phased array antenna, the second signal to the mobile device, the second signal being transmitted in a direction that is based on the steering, and wherein a gain of the second signal is based on the determined second frequency.

20. The system of claim 19, wherein the second signal provides enough gain for the mobile device to access a communication network of a communication service provider from the aircraft.

* * * * *